United States Patent
Van Druten et al.

(10) Patent No.: US 9,531,234 B2
(45) Date of Patent: Dec. 27, 2016

(54) FLYWHEEL MODULE FOR A VEHICLE, AS WELL AS METHODS OF OPERATING THE FLYWHEEL MODULE

(71) Applicant: DTI Group B.V., Eindhoven (NL)

(72) Inventors: Roell Marie Van Druten, Eindhoven (NL); Alexander Franciscus Anita Serrarens, Waalre (NL); Bas Gerard Vroemen, Eindhoven (NL)

(73) Assignee: DTI Group B.V., Eindhoven (NL)

( * ) Notice: Subject to any disclaimer, the term of this patent is extended or adjusted under 35 U.S.C. 154(b) by 0 days.

(21) Appl. No.: 14/360,431

(22) PCT Filed: Nov. 23, 2012

(86) PCT No.: PCT/NL2012/050837
§ 371 (c)(1),
(2) Date: May 23, 2014

(87) PCT Pub. No.: WO2013/077736
PCT Pub. Date: May 30, 2013

(65) Prior Publication Data
US 2014/0338993 A1    Nov. 20, 2014

(30) Foreign Application Priority Data

Nov. 23, 2011 (NL) ................................ 2007848
Aug. 31, 2012 (NL) ................................ 2009401

(51) Int. Cl.
| | | |
|---|---|---|
| *B60K 6/30* | (2007.10) | |
| *B60K 6/10* | (2006.01) | |
| *H02K 7/02* | (2006.01) | |
| *B60K 6/365* | (2007.10) | |
| *F16D 67/02* | (2006.01) | |
| *B60K 6/42* | (2007.10) | |
| *F02B 63/04* | (2006.01) | |
| *H02K 7/112* | (2006.01) | |
| *H02K 7/116* | (2006.01) | |
| *B60K 6/387* | (2007.10) | |
| *B60K 6/38* | (2007.10) | |

(52) U.S. Cl.
CPC ............... *H02K 7/02* (2013.01); *B60K 6/105* (2013.01); *B60K 6/30* (2013.01); *B60K 6/365* (2013.01);
(Continued)

(58) Field of Classification Search
CPC ................................. B60K 6/30; B60K 6/105
See application file for complete search history.

(56) References Cited

U.S. PATENT DOCUMENTS 2,803,151 A    8/1957  Clerk
2005/0107204 A1    5/2005  Van Druten et al.
(Continued)

FOREIGN PATENT DOCUMENTS

CN    101061013 A    10/2007
CN    102239343 A    11/2011
(Continued)

OTHER PUBLICATIONS

Apr. 10, 2013—International Search Report and Written Opinion of PCT/NL2012/050837.

*Primary Examiner* — Tisha Lewis
(74) *Attorney, Agent, or Firm* — Banner & Witcoff, Ltd.

(57) ABSTRACT

A flywheel module comprises a bypass transmission with three rotational members, and a flywheel connected to a first one of the rotational members. A second one of the rotational members is connected to the input/output. An electric machine which can function both as a motor and as a generator is connected to a third one of the rotational members. An actuator is provided for actuating the electric machine. A control unit is provided for driving the actuator, as well as an operator for operating the brake and the clutch.

14 Claims, 3 Drawing Sheets

(52) U.S. Cl.
CPC ............. *B60K 6/42* (2013.01); *F02B 63/04* (2013.01); *F16D 67/02* (2013.01); *H02K 7/112* (2013.01); *H02K 7/116* (2013.01); *B60K 6/387* (2013.01); *B60K 2006/381* (2013.01); *B60Y 2400/422* (2013.01); *Y02T 10/6204* (2013.01); *Y02T 10/6282* (2013.01); *Y10S 903/96* (2013.01)

(56) References Cited

U.S. PATENT DOCUMENTS

| | | | |
|---|---|---|---|
| 2007/0060432 A1* | 3/2007 | Van Druten | B60K 6/105 475/5 |
| 2007/0219038 A1 | 9/2007 | Druten et al. | |
| 2011/0106359 A1* | 5/2011 | Tanaka | B60K 6/105 701/22 |
| 2011/0281681 A1 | 11/2011 | Van Druten et al. | |
| 2012/0197472 A1* | 8/2012 | He | B60K 6/105 701/22 |
| 2013/0288851 A1 | 10/2013 | Tanaka et al. | |

FOREIGN PATENT DOCUMENTS

| | | | | |
|---|---|---|---|---|
| DE | 3928133 A1 | * | 3/1990 | ............. F16D 67/04 |
| EP | 2319718 | | 5/2011 | |
| JP | 2009143485 A | * | 7/2009 | ............. B60K 6/365 |
| JP | 2010254179 A | | 11/2010 | |
| JP | 2011098635 A | | 5/2011 | |
| WO | 2010059041 A1 | | 5/2010 | |
| WO | WO 2010151113 | | 12/2010 | |

\* cited by examiner

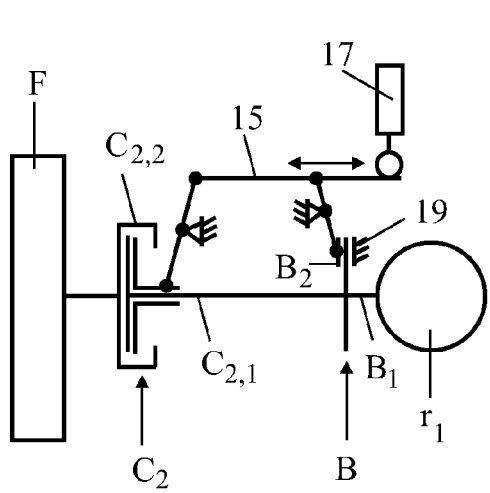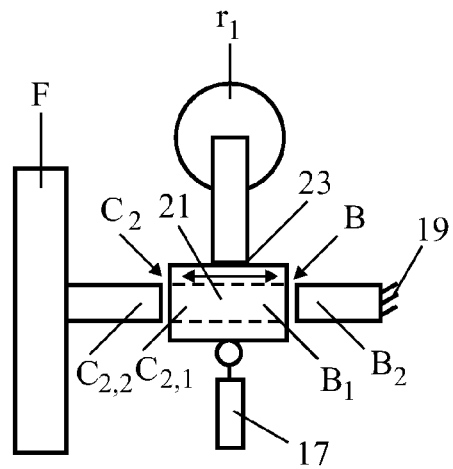
FIG. 5    FIG. 6
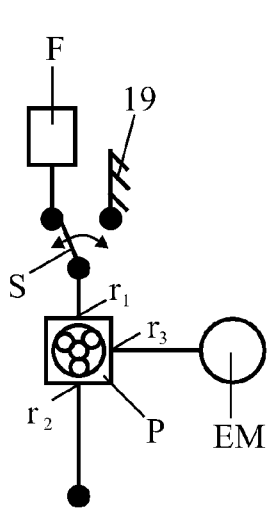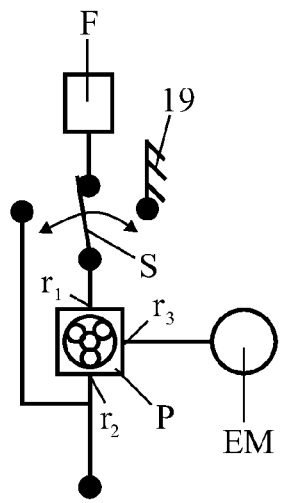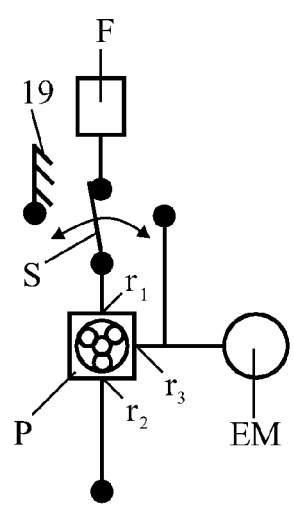
FIG. 7    FIG. 8    FIG. 9

FLYWHEEL MODULE FOR A VEHICLE, AS WELL AS METHODS OF OPERATING THE FLYWHEEL MODULE

FIELD OF THE INVENTION

The invention relates to a flywheel module comprising:
a bypass transmission comprising at least three rotational members,
a flywheel which is connected to a first one of the three rotational members, while a second one of the rotational members is connected to an input/output of the flywheel module,
an electric machine which can operate both as a motor and as a generator and which is connected to a third one of the rotational members,
actuation means for actuating the electric machine, which comprises, for example, a battery,
a control unit for controlling the actuation means,
a clutch located between the first rotational member and the flywheel, which clutch comprises two clutch sections of which a first clutch section is connected to the first rotational member and the second clutch section is connected to the flywheel,
a brake located between the clutch and the first rotational member, which brake comprises two brake sections, of which a first brake section is connected to the first rotational member and the second brake section is connected to the firm object, which firm object is formed for example by the housing of a differential of a vehicle, and
operating means for operating the brake and the clutch.

STATE OF THE ART

A similar flywheel module is known from WO 2010/059041 A1. In this known flywheel construction energy can be stored in a flywheel and released from the flywheel in a simple manner by means of a relatively cost effective construction.

SUMMARY OF THE INVENTION

It is an object of the invention to provide a flywheel module of the type defined in the opening paragraph which is even simpler than the known flywheel module. For this purpose, the flywheel module according to the invention is characterized in that the operating means comprise only a single actuator for operating both the clutch and the brake.

The actuator is preferably connected to the clutch and the brake such that this actuator operates the clutch and the brake substantially simultaneously.

Furthermore, the actuator is preferably connected to the clutch and the brake such that this actuator either opens the clutch and closes the brake or vice versa, so does not open or close the two simultaneously.

An advantageous embodiment of the flywheel module according to the invention is characterized in that the first brake section and the first clutch section form part of a moveable switch element which is connected to the first rotational member, preferably by means of a spline, and which is moveable between a brake position in which the switch element is coupled to the firm world and a coupling position in which the switch element is coupled to the flywheel.

A further advantageous embodiment of the flywheel module according to the invention is characterized in that the switch element can also adopt an intermediate position in which it is connected neither to the firm world nor to the flywheel.

The clutch sections and/or brake sections are preferably locked up to each other in coupled state or braked state respectively. Worded differently, the clutch is a locked up clutch and/or the brake is a locked up brake.

The brake is preferably arranged as a claw clutch or synchromesh. The clutch too is preferably arranged as a claw clutch or synchromesh.

A transmission is preferably located between the first rotational member and the flywheel.

The flywheel module further preferably includes a further clutch which is located between the input/output and the second rotational member or between two of the rotational members.

The invention likewise relates to a vehicle comprising a drive source provided with a drive shaft, wheels connected to the drive shaft via a drive line, a main clutch located in the drive line and connected to the drive shaft, a transmission located in the drive line between the main clutch and the wheels, which vehicle furthermore includes a flywheel module according to the present invention, whose input/output is connected to the drive source, the transmission, the wheels, the drive line or further wheels of the vehicle. The drive source is preferably a combustion engine.

An advantageous embodiment of the vehicle according to the invention is characterized in that the actuation means comprise a battery to which also a starter motor of the vehicle is coupled for starting the drive source.

A further advantageous embodiment of the vehicle according to the invention is characterized in that the vehicle further includes a further electric machine which is connected to the input/output, the flywheel, the drive source, the drive line, or one or more of the further wheels.

In another advantageous embodiment the drive source is formed by a further electric machine.

Preferably, the control unit comprises power electronics which with one of the electric machines allow for the driving or braking of other electric machines.

Furthermore, the input/output of the flywheel module is preferably connected to the drive source by means of a Multi-V pulley by which also auxiliaries of the drive source are driven.

The invention further relates to a method of driving or braking the vehicle according to the invention. This method is characterized in that the vehicle is driven or braked by actuation of the electric machine when the brake is closed and the clutch is opened.

The invention furthermore relates to a method of generating energy in the vehicle according to the invention. This method is characterized in that the electric machine is used as an alternator when the brake is closed and the clutch is opened.

The invention further relates to a method of starting the drive source of the vehicle according to the invention. This method is characterized in that the electric machine is used as a starter motor for starting the drive source.

The invention further relates to a method of operating the clutch of the flywheel module of the vehicle according to the invention. This method is characterized in that the electric machine is actuated such that the clutch can be opened substantially torquelessly or can be closed substantially synchronously.

BRIEF DESCRIPTION OF THE DRAWINGS

The invention will be elucidated more fully hereinbelow based on examples of embodiment of a flywheel module according to the invention either or not located in a drive mechanism of a vehicle while reference is made to the appended drawing figures, in which:

FIG. 5 shows a detail of a first embodiment of the brake and the clutch and the drive mechanism of it;

FIG. 6 shows a detail of a second embodiment of the brake and the clutch and the operating mechanism of it;

FIG. 7 shows a first embodiment of the flywheel module according to the invention;

FIG. 8 shows a second embodiment of the flywheel module according to the invention; and FIG. 9 shows a third embodiment of the flywheel module according to the invention.

DETAILED DESCRIPTION OF THE DRAWINGS

Figure 1:
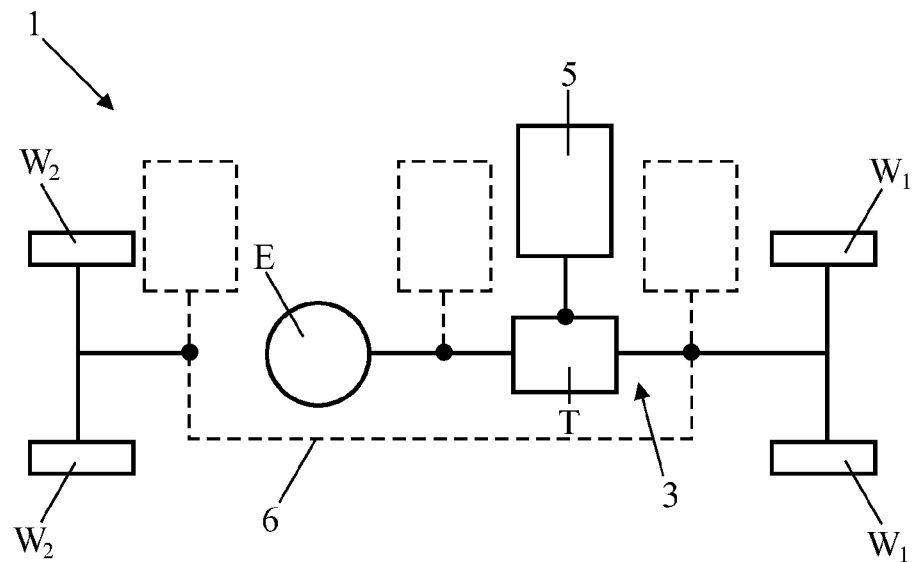
FIG. 1 shows a diagrammatic lay out of a drive mechanism of a vehicle comprising a flywheel module according to the invention.

FIG. 1 shows a diagrammatic lay-out of a drive mechanism of a vehicle 1, which comprises a drive source E which drives wheels $W_1$ by means of a drive line 3. A main clutch $C_1$ and a transmission T form part of this drive line. The vehicle further includes a flywheel module 5 which may be connected to the transmission T or on the primary side or secondary side of the transmission T may be connected to the drive line 3 or is connected to one or both wheels $W_2$ of the vehicle. These alternative positions are indicated by broken lines. In the latter case the flywheel module may in addition be connected to the drive line 3. This is shown diagrammatically by connecting line 6.

Figure 2:
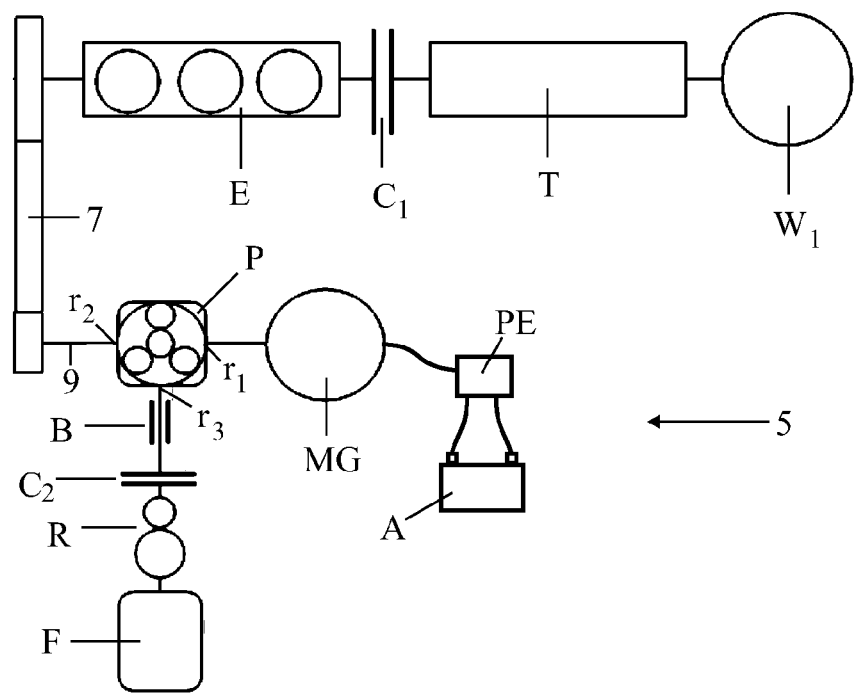
FIG. 2 gives a diagrammatic representation of an embodiment of the drive mechanism.

FIG. 2 gives a diagrammatic representation of an embodiment of the drive mechanism. The drive source E is configured here as a combustion engine and is connected to the input/output 9 of the flywheel module 3 by means of a multi-V pulley 7. Also auxiliaries of the combustion engine are driven by means of this multi-V pulley.

The flywheel module 3 has a bypass transmission which is arranged as a planetary gear set P having three rotational members, and a flywheel F which is connected to a first one of the rotational members $r_1$. A second one of the rotational members $r_2$ is connected to the input/output 9. The flywheel module further includes an electric machine MG which can function both as a motor and as a generator and which is connected to a third one of the rotational members $r_3$, as well as actuation means formed by a battery A for actuating the electric machine.

Furthermore, the flywheel module comprises a control unit for controlling the actuation means. This control unit has power electronics PE for controlling the actuation means. The control unit only briefly controls the actuation means as a result of which the braking or driving of the drive line and/or one or more of the further wheels takes place only briefly. The electric machine is driven at speeds lower than the speed at the second input/output of the module. The motor and/or generator is driven in both positive and negative direction of rotation to limit the absolute speed.

The electric machine can be a permanent magnet machine with an inner or outer rotor or a claw pole motor or a switch reluctance motor, which can be operated both as a motor and as a generator. The control electronics may be integrated in the motor housing or be installed close to it. The battery, which is connected to the electric machine, may be the existing 12V battery of the vehicle which provides the power supply to the auxiliaries or may be a separate battery (12V, 24V, 36V, 48V or upwards thereof) which is electrically coupled or not to the existing 12V battery.

By exerting a negative torque by the electric machine on the bypass transmission, the flywheel accelerates and by exerting a positive torque by the electric machine on the bypass transmission, the flywheel decelerates. The flywheel module temporarily drives the vehicle, so that the combustion engine can change the speed without there being an interruption of the torque on the wheels. Depending on the speed of the vehicle a decision is made to open or close the clutch.

The flywheel module 3 further includes a clutch $C_2$ which is located between the first rotational member and the flywheel, as well as a brake B which is located between the clutch and the first rotational member, and a reducing mechanism R arranged as a gear transmission which is located between the clutch and the flywheel.

Figure 3:
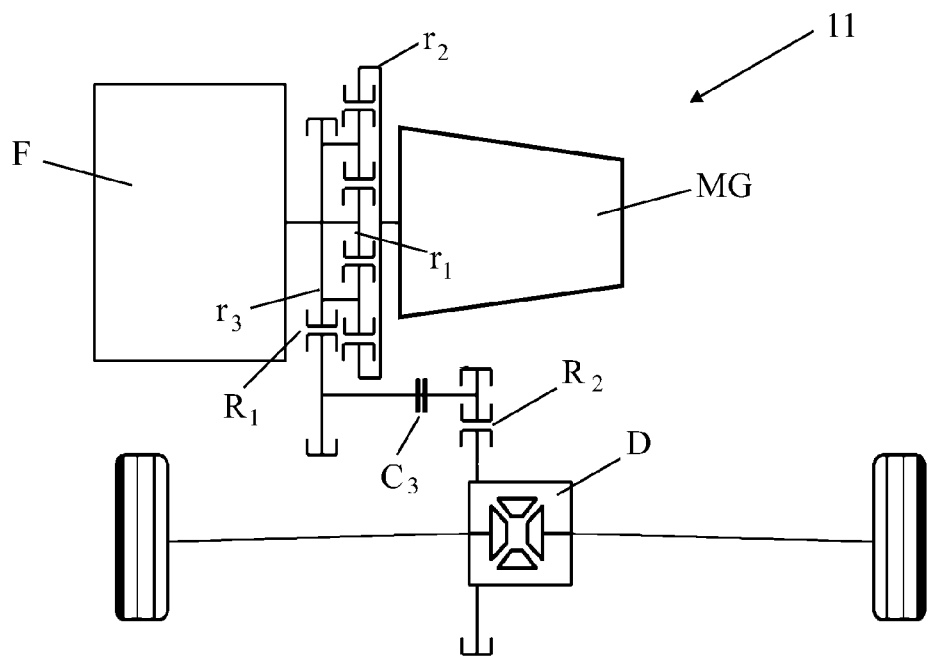
FIG. 3 shows a first further embodiment of the drive mechanism.

FIG. 3 shows a first further embodiment of the flywheel module 11 in which the flywheel F and the electric machine MG are positioned coaxially and concentrically relative to each other and are connected directly to the first and the second rotational members $r_1$ and $r_2$ of the planetary gear set P. The third rotational member $r_3$ is connected via two gear transmissions $R_1$ and $R_2$ to a differential D, while yet another auxiliary clutch $C_3$ is located between these gear transmissions. This auxiliary clutch is arranged as a claw clutch and/or synchromesh. The differential may be connected to the front wheels or the rear wheels of the vehicle.

Figure 4:
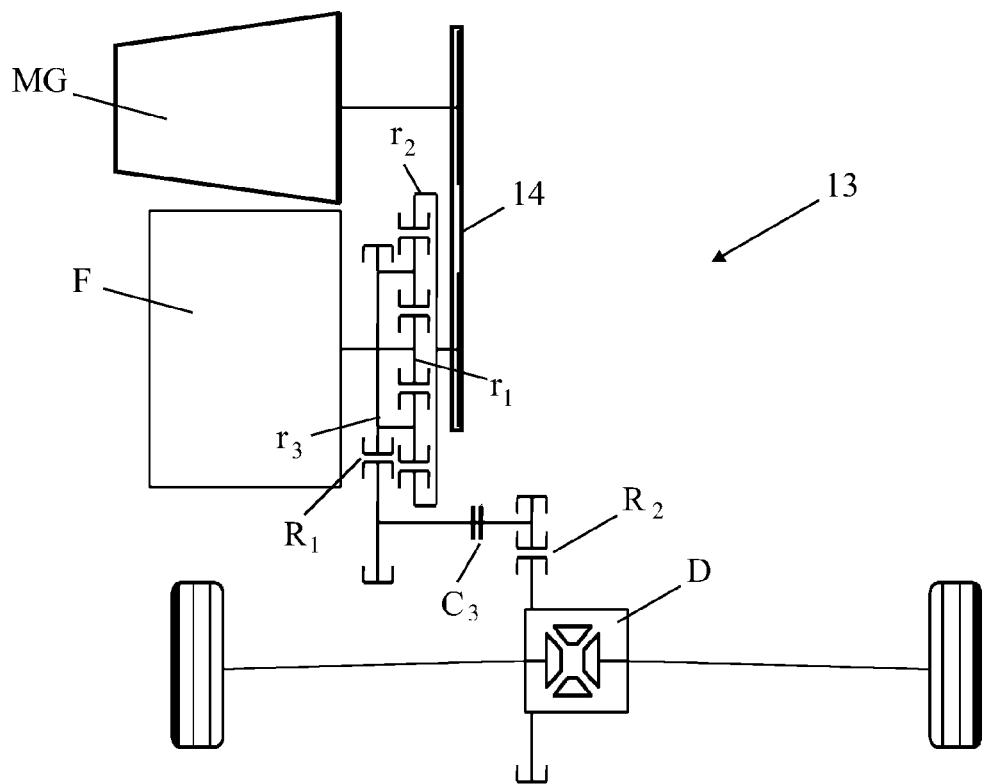
FIG. 4 shows a second further embodiment of the drive mechanism.

FIG. 4 shows a second further embodiment of the flywheel module 13 in which the flywheel F and the electric machine MG run parallel to each other. The second rotational member $r_2$ in this configuration is connected to the electric machine MG via a chain transmission 14.

FIG. 5 shows a detail of a first embodiment of the brake and the clutch and the drive mechanism of it. The brake B and the clutch $C_2$ are arranged here as a friction brake or friction clutch respectively. The operating means have no more than a single operating element 15 which can be shifted by an actuator 17 (formed by an electromotor having a gear on the output shaft which is in meshing engagement with a toothed bar located on the operating element) and simultaneously operates the brake B and the clutch $C_2$, where this actuator either opens the clutch and closes the brake or vice versa, so does not open or close these two simultaneously.

The clutch $C_2$ comprises two clutch sections $C_{2,1}$ and $C_{2,2}$ of which a first clutch section $C_{2,1}$ is connected to the first rotational member $r_1$ and the second clutch section $C_{2,2}$ is connected to the flywheel F. The brake B comprises two brake sections $B_1$ and $B_2$ of which a first brake section $B_1$ is connected to the first rotational member $r_1$ and the second brake section $B_2$ is connected to the firm object 19, for example the housing of the differential of the vehicle.

FIG. 6 shows a detail of a second embodiment of the brake and the clutch and the operating mechanism of it. In this configuration the brake B and the clutch $C_2$ are arranged as lock-up claw clutches in which the sections $C_{2,2}$ and $B_2$ are arranged as ends of a shaft having external teeth, and the sections $C_{2,1}$ and $B_1$ form ends of a sleeve 21 having internal teeth which sleeve can be moved axially by the actuator 17 (again formed by an electromotor having a gear on the output shaft which is in meshing engagement with a toothed shaft located on the sleeve). The sleeve 21 is slidably coupled to the first rotational member $r_1$ via a splined connection 23. The sleeve may also adopt an intermediate position (the position shown in FIG. 6) in which the sleeve is connected neither to the firm object 19 nor to the flywheel F.

FIG. 7 gives a diagrammatic representation of a first embodiment of the flywheel module according to the invention. In this embodiment the switch element S is capable of moving between two positions, a position in which the first rotational member $r_1$ of the planetary gear set P is coupled to the flywheel F and a position in which the first rotational member is coupled to the firm object 19.

FIG. 8 gives a diagrammatic representation of a second embodiment of the flywheel module according to the invention. In this second embodiment the switch element S is capable of moving among three positions; in addition to the two positions mentioned above there is also a third position in which the first rotational member $r_1$ of the planetary gear set is coupled to the second rotational member $r_2$.

FIG. 9 gives a diagrammatic representation of a third embodiment of the flywheel module according to the invention. In this third embodiment the switch element S is also capable of moving among three positions, while in the third position the first rotational member $r_1$ of the planetary gear set is coupled to the third rotational member $r_3$.

The switch element may be operated electro-hydraulically, electro-pneumatically (by means of air pressure or vacuum), electro-mechanically or electro-magnetically.

With the vehicle and/or the wheels at standstill, the clutch system can be put in neutral position so that the flywheel can idle freely and the electric machine can be reduced to zero revolutions per minute (in this manner the losses of the vehicle when idling are minimized).

Furthermore, with the vehicle and/or the wheels at standstill the switch element can be put in brake position in which the first rotational member is coupled to the firm object, so that by actuating the electric machine in positive or negative direction the vehicle can be driven in forward or rearward direction (the flywheel can continue to be idling freely).

The switch element may be put in the flywheel position (in which the first rotational member is coupled to the flywheel) from the neutral position by first synchronizing by means of the electric machine the number of revolutions of the first rotational member in such manner with the number of revolutions of the flywheel that the coupling to the switch element can be realized.

The switch element can further be put in the brake position from the neutral position by first synchronizing by means of the electric machine the number of revolutions of the first rotational member with the firm object so that the coupling can be made to the switch element.

The switch element can be put in the lock position (in which the first rotational member is coupled to the second/third rotational member) from the neutral position by first synchronizing by means of the electric machine the number of revolutions of the first rotational member with the second/third rotational member so that the coupling can be made to the switch element.

In an embodiment the second rotational member may be coupled to the driven wheels, which wheels cannot be driven by means of a combustion engine.

An advantage of driving the vehicle in the brake position is that the performance of the flywheel module does not depend on the number of revolutions of the flywheel, but only on the performance of the electric machine and the battery coupled to the electric machine.

A advantage of driving the vehicle in the lock position is that the number of revolutions of the electric machine is lower than in the brake position, so that even at higher vehicle speeds the electric machine may be continued to be coupled to the wheels (and thus the second rotational member need not be decoupled from the wheels).

Albeit the invention has been described in the foregoing with reference to the drawings, it should be observed that the invention is not by any manner or means restricted to the embodiment shown in the drawings. The invention also extends to all embodiments deviating from the embodiment shown in the drawings within the scope defined by the claims.

What is claimed is:

1. A flywheel module comprising:
a bypass transmission comprising at least three rotational members;
a flywheel which is connected to a first one of the three rotational members, while a second one of the rotational members is connected to an input/output of the flywheel module;
an electric machine which can operate both as a motor and as a generator and which is connected to a third one of the rotational members;
an actuation means for actuating the electric machine;
a control unit for controlling an actuator;
a clutch comprising two clutch sections of which a first clutch section is connected to the first rotational member and the second clutch section is connected to the flywheel;
a brake comprising two brake sections of which a first brake section is connected to the first rotational member and the second brake section is connected to a firm object; and
an operating element that includes only a single actuator for operating both the clutch and the brake,
wherein the actuator is connected to the clutch and the brake such that this actuator either opens the clutch and closes the brake or vice versa, and
wherein the first brake section and the first clutch section form part of a moveable switch element which is connected to the first rotational member, and which is moveable between a brake position in which the switch element is coupled to the firm object and a coupling position in which the switch element is coupled to the flywheel.

2. A flywheel module as claimed in claim 1, wherein the actuator is connected to the clutch and the brake such that this actuator operates the clutch and the brake simultaneously or substantially simultaneously.

3. A flywheel module as claimed in claim 1, wherein the switch element can also adopt an intermediate position in which it is connected neither to the firm object nor to the flywheel.

4. A flywheel module as claimed in claim 1, wherein the clutch sections and/or brake sections are locked up to each other in coupled state or braked state respectively.

5. A flywheel module as claimed in claim 1, wherein the brake is arranged as a claw clutch or synchromesh.

6. A flywheel module as claimed in claim 1, wherein the clutch is arranged as a claw clutch or synchromesh.

7. A flywheel module as claimed in claim 1, wherein the flywheel module further includes a further clutch which is located between the input/output and the second rotational member or between two of the rotational members.

8. A vehicle comprising:
a drive source provided with a drive shaft, wheels connected to the drive shaft via a drive line, a main clutch located in the drive line and connected to the drive shaft, a transmission located in the drive line between the main clutch and the wheels, and further wheels not connected to the drive shaft;
a flywheel module comprising:
   a bypass transmission comprising at least three rotational members;
   a flywheel which is connected to a first one of the three rotational members, while a second one of the rotational members is connected to an input/output of the flywheel module;
   an electric machine which can operate both as a motor and as a generator and which is connected to a third one of the rotational members;
   an actuation means for actuating the electric machine;
   a control unit for controlling an actuator;
   a clutch comprising two clutch sections of which a first clutch section is connected to the first rotational member and the second clutch section is connected to the flywheel;
   a brake comprising two brake sections of which a first brake section is connected to the first rotational member and the second brake section is connected to a firm object; and
   an operating element for operating the brake and the clutch,
   wherein the actuator is connected to the clutch and the brake such that this actuator either opens the clutch and closes the brake or vice versa, and
   wherein the first brake section and the first clutch section form part of a moveable switch element which is connected to the first rotational member, and which is moveable between a brake position in which the switch element is coupled to the firm object and a coupling position in which the switch element is coupled to the flywheel; and
wherein the input/output is operably connected to the drive source, the transmission, the wheels, the drive line, or further wheels of the vehicle.

9. A vehicle as claimed in claim 8, wherein the drive source is a combustion engine.

10. A vehicle as claimed in claim 9, wherein the actuator comprises a battery to which a starter motor of the vehicle is also coupled for starting the drive source.

11. A vehicle as claimed in claim 8, wherein the vehicle further includes a further electric machine which is connected to the input/output, the flywheel, the drive source, the drive line, or one or more of the further wheels.

12. A vehicle as claimed in claim 11, wherein the control unit comprises power electronics which with one of the electric machines allow for the driving or braking of other electric machines.

13. A vehicle as claimed claim 8, wherein the input/output of the flywheel module is connected to the drive source by means of a Multi-V pulley by which also auxiliaries of the drive source are driven.

14. A flywheel module comprising:
a bypass transmission comprising at least three rotational members;
a flywheel which is connected to a first one of the three rotational members, while a second one of the rotational members is connected to an input/output of the flywheel module;
an electric machine which can operate both as a motor and as a generator and which is connected to a third one of the rotational members;
an actuator for actuating the electric machine;
a control unit for controlling the actuator;
a clutch comprising two clutch sections of which a first clutch section is connected to the first rotational member and the second clutch section is connected to the flywheel;
a brake comprising two brake sections of which a first brake section is connected to the first rotational member and the second brake section is connected to a firm object; and
an operating element that includes only a single actuator for operating both the clutch and the brake, and
wherein a transmission is located between the first rotational member and the flywheel.

* * * * *